United States Patent
Hostetter et al.

(10) Patent No.: US 6,728,736 B2
(45) Date of Patent: Apr. 27, 2004

(54) SYSTEM AND METHOD FOR SYNCHRONIZING A DATA COPY USING AN ACCUMULATION REMOTE COPY TRIO

(75) Inventors: David G. Hostetter, Superior, CO (US); Michael S. Milillo, Louisville, CO (US); Chrisopher J. West, Boulder, CO (US); Robert P. Eskenberry, Broomfield, CO (US)

(73) Assignee: Storage Technology Corporation, Louisville, CO (US)

( * ) Notice: Subject to any disclaimer, the term of this patent is extended or adjusted under 35 U.S.C. 154(b) by 183 days.

(21) Appl. No.: 09/805,503

(22) Filed: Mar. 14, 2001

(65) Prior Publication Data

US 2002/0133511 A1 Sep. 19, 2002

(51) Int. Cl.[7] .............................................. G06F 17/30
(52) U.S. Cl. ...................... 707/204; 707/202; 707/205
(58) Field of Search ............................... 707/201–204, 707/500.1

(56) References Cited

U.S. PATENT DOCUMENTS

| | | | | |
|---|---|---|---|---|
| 5,577,222 A | * | 11/1996 | Micka et al. ............... | 711/112 |
| 5,742,792 A | * | 4/1998 | Yanai et al. ................ | 711/162 |
| 5,787,415 A | * | 7/1998 | Jacobson et al. .............. | 707/2 |
| 5,809,527 A | * | 9/1998 | Cooper et al. .............. | 711/133 |
| 5,809,543 A | * | 9/1998 | Byers et al. ................. | 711/162 |
| 5,835,953 A | * | 11/1998 | Ohran ......................... | 711/162 |
| 5,987,566 A | * | 11/1999 | Vishlitzky et al. .......... | 711/144 |
| 6,009,481 A | * | 12/1999 | Mayer ......................... | 710/33 |
| 6,073,222 A | * | 6/2000 | Ohran ......................... | 711/162 |
| 6,131,148 A | * | 10/2000 | West et al. .................. | 711/162 |
| 6,397,307 B2 | * | 5/2002 | Ohran ......................... | 711/161 |
| 6,446,176 B1 | * | 9/2002 | West et al. .................. | 711/162 |
| 6,526,419 B1 | * | 2/2003 | Burton et al. ............... | 707/204 |

FOREIGN PATENT DOCUMENTS

WO    WO 00 49500 A    8/2000

* cited by examiner

Primary Examiner—Uyen Le
Assistant Examiner—Hanh Thai
(74) Attorney, Agent, or Firm—Brooks Kushman P.C.

(57) ABSTRACT

A system and method for synchronizing a data copy that include a source volume having a data file stored thereon, the source volume for receiving write commands from a host, executing the write commands to generate an updated data file, and generating a record of the write commands. The system and method further include a secondary volume having a copy of the data file stored thereon, the secondary volume for receiving and storing data indicated by the write command record, wherein the copy of the data file and the data indicated by the write command record are available for use in generating a copy of the updated data file.

13 Claims, 2 Drawing Sheets

SYSTEM AND METHOD FOR SYNCHRONIZING A DATA COPY USING AN ACCUMULATION REMOTE COPY TRIO

TECHNICAL FIELD

The present invention relates generally to a system and method for synchronizing a remote data copy and, more particularly, to a system and method for efficient snapshot synchronization of a data copy using an accumulation remote copy trio including a source volume, accumulated write commands, and an established peer-to-peer remote copy (PPRC) volume pair.

BACKGROUND ART

With increasingly large amounts of data being handled in data processing systems, storage systems, such as disk or tape storage systems, are being used to store data. Some organizations rely heavily on data and quick access to the data. Disasters caused by environmental conditions, user errors, or application errors may occur in which access to the data is lost for some period of time. Mirroring or copying data to a secondary storage system from a primary storage system is currently employed for recovery purposes to minimize the time in which access to data is lost due to such a disaster.

In that regard, peer-to-peer remote copy (PPRC) is a synchronous copy mechanism that creates a copy of data at a remote or secondary storage system. The copy at the secondary storage is kept current with the data located at the primary storage system. In other words, a copy of the data located at the secondary storage system is kept in synch with the data at the primary storage system as observed by the user of the data. Volume pairs are designated in which a volume in the primary storage system is paired with a volume in the secondary storage system. Data transfer occurs in pairs in which data is transferred from a volume in a primary storage system to a corresponding volume in a secondary storage system, which together may be referred to as an established PPRC pair.

With a PPRC system, a data copy made to the secondary, or "recovery," storage system occurs synchronously from a host point of view with write operations to volumes in the primary storage system. When data is written to the primary storage system, the data written to a particular volume is also written to a corresponding volume in the secondary storage system using a path to the secondary storage system.

Effecting a data copy from a primary volume to a secondary volume in a PPRC system may include an internal snapshot copying mechanism for copying all of the data of a source storage volume to a primary storage volume in a PPRC pair, which data is then migrated to the corresponding secondary storage volume. The internal snapshot copying mechanism makes a copy of at least one pointer to the data of a source volume, and the primary volume in the PPRC pair uses the pointers to access the data. The internal snapshot copying mechanism makes a copy of the data of a source volume to a primary volume of a PPRC pair by using pointers to the data in the source volume and then storing the pointers in a map. By using pointers, the internal snapshot mechanism can quickly copy the data from the source volume without affecting the access of a host to the source volume. The primary volume then transfers the data to the corresponding secondary volume without any host access interruption to the source volume.

There is, however, a large time difference between snapshot copies and synchronizing remote copies. That is, if a user wants to migrate a point-in-time copy of data from a source volume to a secondary volume in a PPRC pair by snapshot copying the source volume to the primary volume in the PPRC pair, the entire source volume is sent to the secondary volume, an operation which can take a very long time.

Further, as the number of PPRC volume pairs that are established and attempt to move from a duplex pending to a duplex state increases, system resources become increasingly degraded as duplex pending pairs are added. Cache space, processor cycles, and data paths are consumed while duplex pending. A duplex pending pair is a pair of corresponding volume pairs in which the system is attempting to copy the primary storage volume to the secondary storage volume. A duplex state pair is a pair of corresponding volume pairs in which the data from the primary storage volume has been copied to the secondary storage volume. Moreover, individual primary volume performance may be additionally affected because the host has to compete with the synchronizing task for access to the source volume. The synchronizing task is the process of migrating the source storage volume to the secondary storage volume.

Thus, there is needed an improved system and method for synchronizing a data copy. In such a system and method, when a user wants to snapshot copy from a simplex source volume to a PPRC volume pair in order to migrate backup data to a secondary system, rather than sending the entire source volume to the secondary volume, only accumulated write commands would be sent. In order to make the snapshot copying and the migration of the data efficient, a bitmap would be used to signify the accumulated write commands. Advantageously, only those write commands would be snapshot copied and migrated to the secondary.

Such a system and method would preferably employ a group of three storage volumes in this operation. The first would be the source volume of the snapshot copy, which would accumulate the write commands in a bitmap. The next would be the target volume of the snapshot copy, which would be a primary volume of a PPRC pair and would receive the results of the write commands and a copy of the bitmap having the accumulated write commands. The final volume would be on the secondary system and would be the secondary volume of the PPRC pair. The three volumes would together comprise an accumulation remote copy trio. The source volume could be specified along with the establishment of the primary target-secondary PPRC pair, or configured through an operations panel. Upon establishment of the PPRC pair, an internal snapshot copy would synchronize the source and primary target volumes. The primary target volume would begin synchronization with the secondary volume by sending over the entire volume. The source volume would establish a bitmap and begin accumulating write commands received from a host. Subsequent snapshot copies from the source volume to the primary target volume would only snapshot copy the accumulated write commands. Only those accumulated write commands would then be migrated to the secondary volume.

Such a system and method would thereby allow a user to make a point-in-time copy of data and very efficiently migrate that copy to a secondary system without impacting the source volume. The target of the snapshot copy would be the primary of a PPRC pair that would transfer only the tracks specified in the bitmap to the secondary volume. In such a fashion, the PPRC pair would become duplex much more efficiently because only the specified tracks in the bitmap would be sent to the secondary volume. The bitmap could represent granularity at a record, track or cylinder level. Such a system and method would thereby remove host impact to the source volume while data is being migrated to the secondary volume. As a result, very little response time degradation would be seen by the host. Still further, the more efficient migration of data to the secondary volume would reduce the time it takes to synchronize the volumes, consume less system resources, and reduce the time interval between potential snapshot copies for migration purposes.

SUMMARY OF THE INVENTION

Accordingly, it is an object of the present invention to provide an improved system and method for synchronizing a data copy.

According to the present invention, then, a system is provided for synchronizing a data copy. The system comprises a source storage volume having a data file stored thereon, the source volume for receiving a series of write commands from a host, executing the series of write commands to generate an updated data file, and generating a record of the series of write commands. The system further comprises a secondary storage volume having a copy of the data file stored thereon, the secondary volume for receiving and storing data indicated by the write command record, wherein the copy of the data file and the data indicated by the write command record are available for use in generating a copy of the updated data file. The system may also comprise a primary target storage volume for receiving the copy of the data file and a copy of the write command record from the source volume, and transmitting the copy of the data file and the data indicated by the write command record to the secondary volume Still further according to the present invention, a method is also provided for synchronizing a data copy. The method comprises storing a data file on a source storage volume, receiving at the source volume a series of write commands from a host, executing the series of write commands to generate an updated data file, and generating a record of the series of write commands. The method further comprises storing a copy of the data file on a secondary storage volume, receiving at the secondary volume data indicated by the write command record, and storing the data indicated by the write command record on the secondary volume, wherein the copy of the data file and the data indicated by the write command record are available for use in generating a copy of the updated data file. The method may also comprise receiving at a primary target storage volume the copy of the data file and a copy of the write command record from the source volume, and transmitting the copy of the data file and the data indicated by the write command record from the target volume to the secondary volume.

According to the present invention, a method is also provided for synchronizing a data copy comprising providing a source storage volume having a data file stored thereon, the source volume for receiving a series of write commands from a host, executing the series of write commands to generate an updated data file, and generating a record of the series of write commands. The method further comprises providing a secondary storage volume having a copy of the data file stored thereon, the secondary volume for receiving and storing data indicated by the write command record, wherein the copy of the data file and the data indicated by the write command record are available for use in generating a copy of the updated data file. The method may also comprise providing a primary target storage volume for receiving the copy of the data file and a copy of the write command record from the source volume, and transmitting the copy of the data file and the data indicated by the write command record to the secondary storage volume.

The above objects and other objects, features, and advantages of the present invention are readily apparent from the following detailed description of the best mode for carrying out the present invention when taken in connection with the accompanying drawings.

BEST MODES FOR CARRYING OUT THE INVENTION

Figure 1:
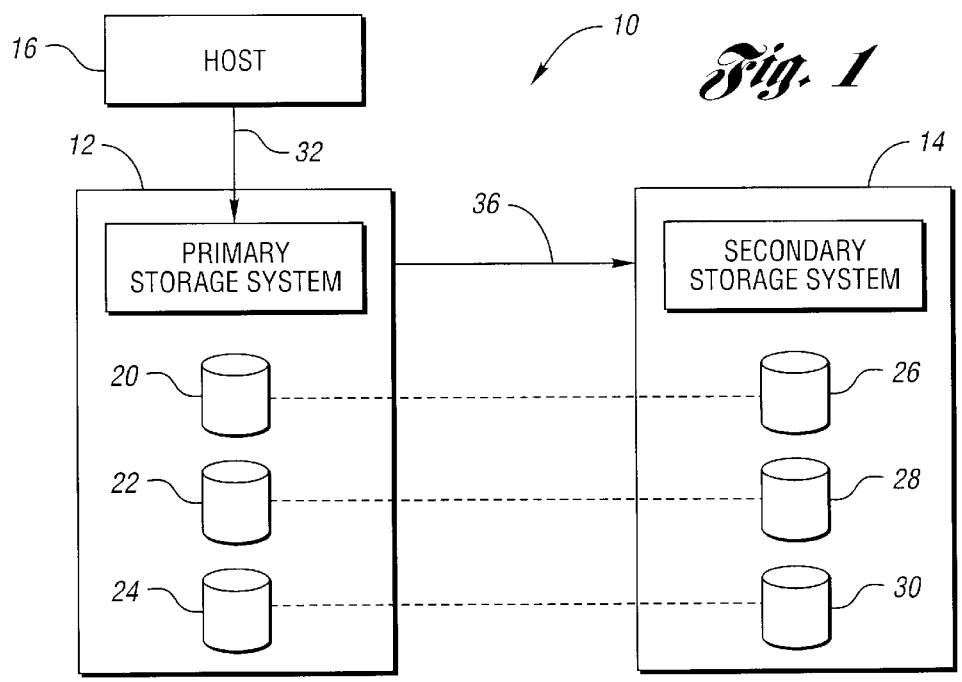
FIG. 1 illustrates a block diagram of a peer-to-peer remote copy (PPRC) system according to the prior art.
Figure 2:
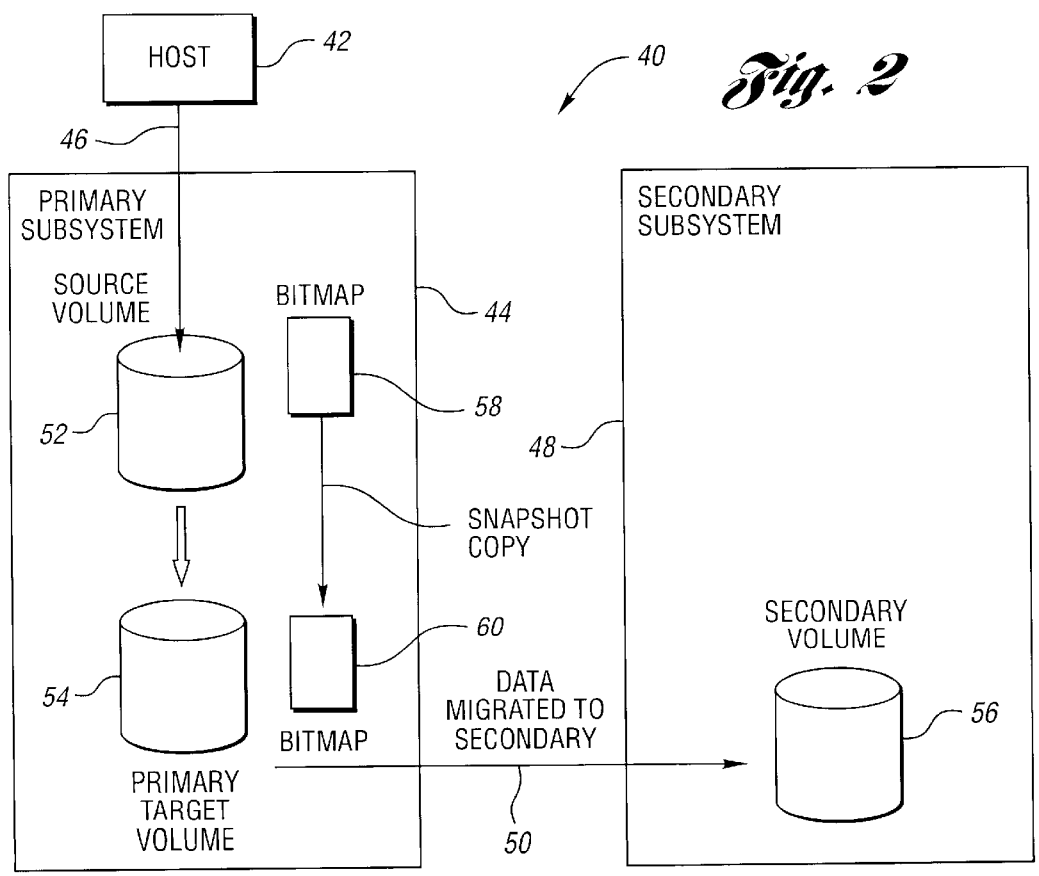
FIG. 2 illustrates a block diagram of the accumulation remote copy trio architecture according to the present invention, including a source volume, target volume, and secondary volume.
Figure 3:
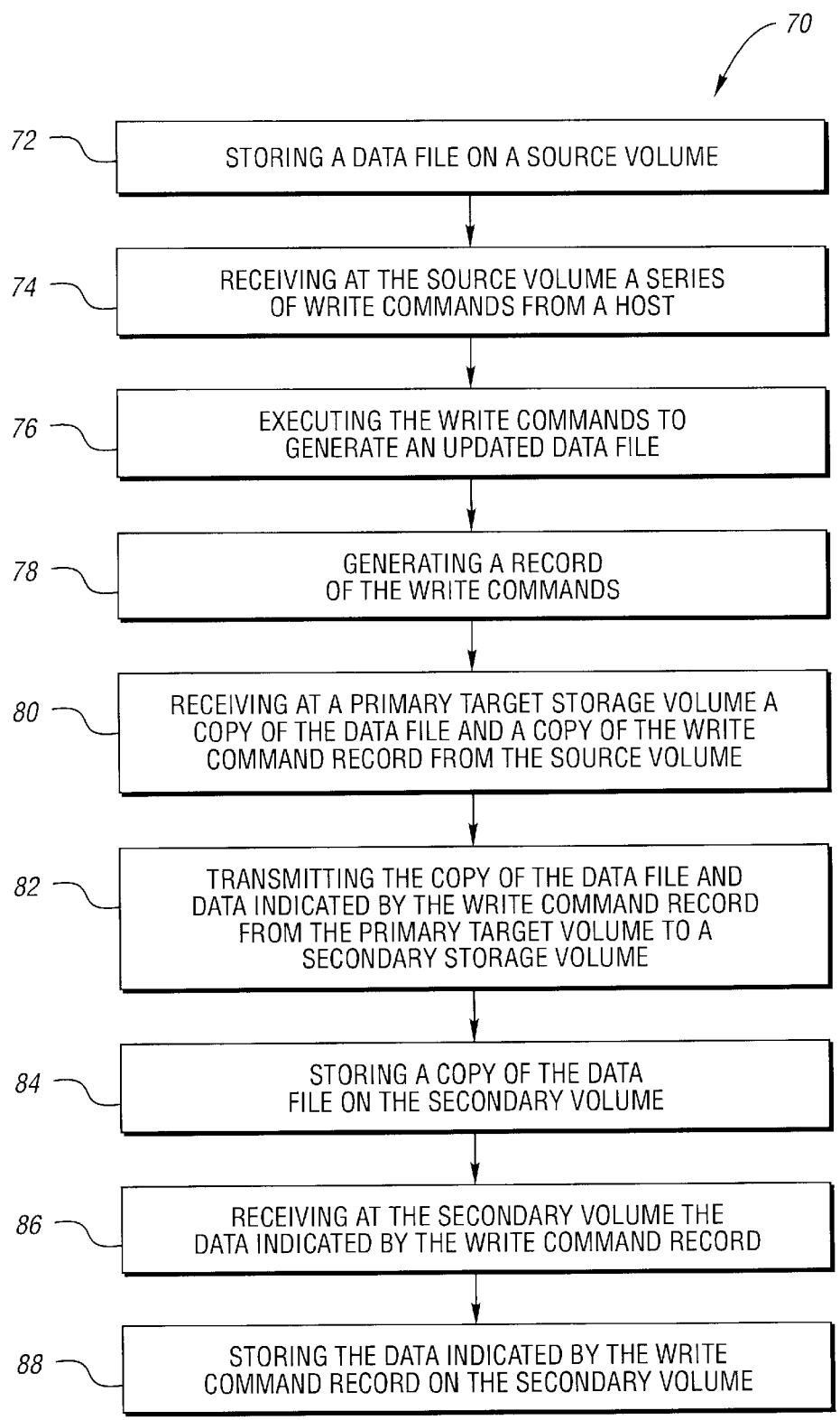
FIG. 3 illustrates a simplified, representative flow chart of the method for efficient snapshot synchronization according to the present invention.

With reference to FIGS. 1–3, the preferred embodiment of the method and system of the present invention will now be described in greater detail. As previously noted, it is common to copy data from a primary storage system to a secondary storage system for recovery purposes in the event of a disaster. In that regard, peer-to-peer remote copy (PPRC) is a synchronous copy mechanism that creates a copy of data at a remote or secondary storage system. In a PPRC system, volume pairs are designated in which a storage volume in the primary system is paired with a storage volume in the secondary system, which together may be referred to as an established PPRC volume pair. A data copy made to the secondary system occurs synchronously from a host point of view with write operations to volumes in the primary system. When data is written to the primary storage system, the data written to a particular volume is also written to a corresponding volume in the secondary storage system using a path to the secondary storage system.

Referring now to FIG. 1, a block diagram of a peer-to-peer remote copy (PPRC) system according to the prior art is shown, denoted generally by reference numeral 10. As seen therein, PPRC system 10 includes a primary storage system 12 and a secondary storage system 14. PPRC system further includes a host 16 connected to primary storage system 12. Host 16 stores data in primary storage system 12. Data written to primary storage system 12 is copied to secondary storage system 14. The copy process creates a copy of the data from primary storage system 12 into secondary storage system 14. The copy process is a PPRC mechanism. In PPRC system 10, a write made by host 16 is considered complete only after the data written to primary storage system 12 also is written to secondary storage system 14. Host 16 may take various forms, such as a server on a network, a Web server on the Internet, or a mainframe computer. Primary storage system 12 and secondary storage system 14 are disk systems in these examples, although tape or other storage systems known in the art may also be used.

A communication path 32 connects host 16 to primary storage system 12. A communication path 36 connects primary storage system 12 with secondary storage system 14. Communication paths 32 and 36 may take various forms, such as, for example, a local area network (LAN), a wide area network (WAN), the Internet, or an intranet. Communication paths 32 and 36 contain various links, such as, for example, fiber optic lines, packet switched communication links, enterprise systems connection (ESCON) fibers, small computer system interface (SCSI) cable, and wireless communication links.

PPRC system 10 is intended as an example of a data processing system and not as an architectural limitation to the present invention. For example, host 16 and primary storage system 12 may be connected directly, while primary storage system 12 and secondary storage system 14 may be connected by a LAN or a WAN. Further, primary storage system 12 and secondary storage system 14 may be connected to each other by a network rather than a direct connection.

Primary storage system 12 includes a set of storage volumes 20, 22, and 24. Secondary storage system 14 includes a set of storage volumes 26, 28, and 30. Secondary storage volumes 26, 28, and 30 correspond to primary storage volumes 20, 22, and 24. The correspondence between the volumes in primary and secondary storage systems 12 and 14 is set up in PPRC pairs, such that a storage volume in primary storage system 12 has a corresponding storage volume in secondary storage system 14. For instance, primary volume 20 is paired with secondary volume 26, primary volume 22 is paired with secondary volume 28, and primary volume 24 is paired with secondary volume 30. These pairs are referred to as established PPRC pairs.

In operation, primary storage system 12 sends data over communication path 36 to secondary storage system 14 each time data is written to a primary storage volume by host 16. Secondary storage system 14 then copies the data to the secondary storage volume corresponding to the primary storage volume. For example, if data is written to primary storage volume 20 then the data is copied to the corresponding secondary storage volume 26. Similarly, if data is written to primary storage volume 22 then the data is copied to the corresponding secondary storage volume 28.

Referring next to FIG. 2, a block diagram of the preferred accumulation remote copy trio architecture according to the present invention is shown, denoted generally by reference numeral 40. As seen therein, a host 42 is provided in communication with primary storage subsystem 44 via communication path 46. Primary storage subsystem 44 is also provided in communication with a secondary storage subsystem 48 via communication path 50. Primary storage subsystem 44 includes a source storage volume 52, which is provided in communication with a primary target storage volume 54. Secondary storage subsystem 48 includes a secondary storage volume 56, which together with primary target storage volume 54 comprise an established PPRC volume pair as previously described. Source volume 52, primary target volume 54, and secondary volume 56 together comprise the preferred accumulation remote copy trio. It should be noted that FIG. 2 depicts a single PPRC volume pair (primary target volume 54 and secondary volume 56) and a single source volume 52 for the sake of simplicity only. As those of ordinary skill will appreciate, additional PPRC volume pairs and source volumes may also be included. Primary storage subsystem 44 and secondary storage subsystem 48 are disk systems in these examples, although tape or other storage systems known in the art may also be used.

Once again, communication paths 46 and 50 may take various forms, such as, for example, a local area network (LAN), a wide area network (WAN), the Internet, or an intranet. Communication paths 46 and 50 contain various links, such as, for example, fiber optic lines, packet switched communication links, enterprise systems connection (ESCON) fibers, small computer system interface (SCSI) cable, and wireless communication links. Moreover, as noted above, the architecture 40 depicted in FIG. 2 is intended as an example of a system in which the present invention may be implemented and not as an architectural limitation to the present invention. For example, host 42 and primary storage system 44 may be connected directly, while primary storage system 44 and secondary storage system 48 may be connected by a LAN or a WAN. Further, primary storage system 44 and secondary storage system 48 may be connected to each other by a network rather than a direct connection.

As noted above, according to the prior art, making a data copy from source volume 52 to secondary volume 56 in a PPRC system may be accomplished by an internal snapshot copying mechanism for copying all of the data of source volume 52 to primary target volume 54, which data is then migrated to corresponding secondary volume 56. The internal snapshot copying mechanism makes a copy of a pointer to the data of source volume 52, and the primary target volume 54 in the PPRC pair uses the pointers to access the data. The internal snapshot copying mechanism makes a copy of the data of source volume 52 to primary target volume 54 of the PPRC pair by using pointers to the data in the source volume 52 and then storing the pointers in a map (not shown). By using pointers, the internal snapshot mechanism can quickly copy the data from the source volume 52 without affecting the access of host 42 to the source volume 52. The primary target volume 54 then transfers the data to the corresponding secondary volume 56 via communication path 50 without any interruption of access by host 42 to source volume 52.

As previously noted, however, there is a large time difference between snapshot copies and synchronizing remote copies. That is, if a user wants to migrate a point-in-time copy of data from source volume 52 to secondary volume 56 in the PPRC pair by snapshot copying the source volume 52 to the primary target volume 54 in the PPRC pair according to the prior art, the entire source volume 52 is sent to the secondary volume 56, an operation which can take a very long time. Further, as also previously noted, as the number of PPRC volume pairs that are established and attempt to move from a duplex pending to a duplex state increases, system resources become increasingly degraded as duplex pending pairs are added. Moreover, individual primary target volume 54 performance may be additionally affected because host 42 has to compete with the synchronizing task for access to source volume 52.

The present invention provides an improved system and method for synchronizing a data copy which overcomes these problems. According to the present invention, when a user wants to snapshot copy from simplex source volume 52 to PPRC volume pair 54, 56 in order to migrate backup data to secondary subsystem 48, rather than sending the entire source volume 52 to the secondary volume 56, only accumulated write commands received by source volume 52 from host 42 are sent. Source volume 52 could be specified along with the establishment of the primary target-secondary PPRC pair 54, 56. Alternatively, source volume 52 could be configured through an operations panel. Upon establishment of the PPRC pair 54, 56, an internal snapshot copy is used to synchronize the source 52 and primary target 54 volumes. The primary target volume 54 begins synchronization with the secondary volume 56 by sending over the entire volume.

Still referring to FIG. 2, source volume 52 has a data file (not shown) stored thereon. In that regard, a single data file is discussed herein for the sake of simplicity only. As is well known to those of ordinary skill in the art, source volume 52 may comprise any number of data files. Source volume 52 receives a series of write commands from host 42 via communication path 46, which source volume 52 may execute in order to generate an updated data file (not shown). In order to make the snapshot copying and the migration of the data efficient, source volume 52 generates a record of the series of write commands received from host 42, preferably by establishing a bitmap 58 which is used to signify the accumulated write commands.

As a result of the initial snapshot copy operation described above, both primary target volume 54 and secondary volume 56 have stored thereon a copy of the data file stored on source volume 52. Subsequent snapshot copies from source volume 52 to primary target volume 54 snapshot copy only the write command record. In that regard, a copy 60 of bitmap 58 having the accumulated write commands is received by primary target volume 54 from source volume 52. Bitmap 58 is then reset at the source volume in order to identify the next set of accumulated write commands. Primary target volume 54 also receives from source volume 52 the data of the write commands from host 42. Only the accumulated write commands, however, are then migrated to secondary volume 56 from primary target volume 54. That is, secondary volume 56 receives and stores the data indicated by the copy 60 of the write command record. In that regard, the copy of the data file (not shown) and the data indicated by the copy of the write command record 60 may be used by the secondary volume 56 in a data recovery operation to generate a copy of the updated data file stored on source volume 52 in the event of a disaster.

The present invention thereby allows a user to make a point-in-time copy of data and very efficiently migrate that copy to a secondary system 48 without impacting the source volume 52. In that regard, the target volume 54 of the snapshot copy is the primary of a PPRC volume pair that transfers only the records, tracks or cylinders specified in the bitmap 58, 60 to the secondary volume 56. In such a fashion, the PPRC pair 54, 56 become duplex much more efficiently because only the specified records, tracks or cylinders in the bitmap 58, 60 are sent to the secondary volume 56. The present invention thereby removes host 42 impact to the source volume 52 while data is being migrated to the secondary volume 56. As a result, very little response time degradation is seen by host 42. Still further, the more efficient migration of data to secondary volume 56 reduces the time it takes to synchronize the volumes 52, 56, consumes less system resources, and reduces the time interval between potential snapshot copies for migration purposes.

Referring finally to FIG. 3, a simplified, representative flow chart of the method for efficient snapshot synchronization according to the present invention is shown, denoted generally by reference numeral 70. As seen therein, the present invention provides a method for synchronizing a data copy comprising storing 72 a data file on a source storage volume, receiving 74 at the source volume a series of write commands from a host, executing 76 the series of write commands to generate an updated data file, and generating 78 a record of the series of write commands. The method may further include receiving 80 at a primary target storage volume a copy of the data file and a copy of the write command record from the source volume, and transmitting 82 a copy of the data file and data indicated by the write command record from the primary target volume to the secondary volume. In that regard, as previously noted, after the copy of the write command record is made to the primary target volume, the write command record is reset at the source volume in order to identify the next group of accumulated write commands. The method further comprises storing 84 a copy of the data file on a secondary storage volume, receiving 86 at the secondary volume data indicated by the write command record, and storing 88 the data indicated by the write command record on the secondary volume, wherein the copy of the data file and the data indicated by write command record are available for use in generating a copy of the updated data file.

It should be noted that the method 70 depicted in FIG. 3 is but one embodiment of the present invention. In that regard, the steps of method 70 may be executed in sequences other than that shown in FIG. 3, which is exemplary only, including the execution of one or more steps simultaneously. Similarly, one or more of the steps of method 70 illustrated in FIG. 3 may be omitted without departing from the scope of the present invention, such as, for example, receiving 80 at a primary target storage volume a copy of the data file and data indicated by the write command record from the source volume, and transmitting 82 the copy of the data file and the data indicated by the write command record from the primary target volume to the secondary volume.

As is readily apparent from the foregoing description, according to the present invention, when a user wants to snapshot copy from a simplex source volume to a PPRC volume pair in order to migrate backup data to a secondary system, rather than sending the entire source volume to the secondary volume, only accumulated write commands are sent. In order to make the snapshot copying and the migration of the data efficient, a bitmap is used to signify the accumulated write commands (i.e., the write command record). Advantageously, only those write commands are snapshot copied and migrated to the secondary. To do so, the present invention preferably employs a group of three storage volumes which together comprise an accumulation remote copy trio. The trio includes a source volume which accumulates the write commands in a bitmap, a primary target volume which receives the write commands and a copy of the bitmap having the accumulated write commands, and a secondary volume. Upon establishment of the primary target and the secondary as a PPRC volume pair, an internal snapshot copy synchronizes the source and the primary target volumes. The primary target volume begins synchronization with the secondary volume by sending over the entire volume. The source volume establishes a bitmap and begins accumulating write commands received from a host. Subsequent snapshot copies from the source volume to the primary target volume snapshot copy only the accumulated write commands, as indicated by the write command record. Only those accumulated write commands are then migrated to the secondary volume.

In such a fashion, the present invention allows a user to make a point-in-time copy of data and very efficiently migrate that copy to a secondary system without impacting the source volume. The target of the snapshot copy is the primary of a PPRC pair that transfers only the tracks, records or cylinders specified in the bitmap to the secondary volume. The PPRC pair therefore becomes duplex much more efficiently because only the specified tracks, records or cylinders in the bitmap are sent to the secondary volume. The present invention thereby removes host impact to the source volume while data is being migrated to the secondary volume. As a result, very little response time degradation is seen by the host. Still further, the more efficient migration of data to the secondary volume reduces the time it takes to synchronize the volumes, consumes less system resources, and reduces the time interval between potential snapshot copies for migration purposes Thus it is apparent that there has been provided, in accordance with the present invention, an improved system and method for synchronizing a remote data copy. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A system for snapshot synchronization of a copy of a data file from a source storage volume in a simplex state to an established peer-to-peer remote copy (PPRC) volume pair in order to migrate the data file copy from a target storage volume of the established PPRC volume pair to a secondary storage volume of the established PPRC volume pair, the system comprising:

a source storage volume in a simplex state, the source volume having a data file stored thereon, the source volume for receiving a series of write commands from a host, executing the series of write commands on the data file to generate an updated data file, and generating a record of the series of write commands;

a target storage volume for receiving a snapshot copy of the data file from the source volume, receiving a snapshot copy of the write command record from the source volume, and generating data indicated by the write command record; and a secondary storage volume for receiving a copy of the data file from the target volume and receiving the data indicated by the write command record from the target volume the secondary volume storing the copy of the data file wherein the stored copy of the data file and the data indicated by the write command record are available for use by the secondary volume in generating a copy of the updated data file, wherein the target and secondary volumes together comprise an established PPRC volume pair.

2. The system of claim 1 wherein the source and secondary volumes each comprise a magnetic tape.

3. The system of claim 1 wherein the source and secondary volumes each comprise a magnetic disk.

4. The system of claim 1 wherein the source, target, and secondary volumes each comprise a magnetic tape.

5. The system of claim 1 wherein the source, target, and secondary volumes each comprise a magnetic disk.

6. The system of claim 1 wherein the record of the series of write commands comprises a bitmap.

7. A method for snapshot synchronization of a copy of a data file from a source storage volume in a simplex state to an established peer-to-peer remote copy (PPRC) volume pair in order to migrate the data file copy from a target storage volume of the established PPRC volume pair to a secondary storage volume of the established PPRC volume pair, the method comprising:

storing a data file on a source storage volume which is in a simplex state;

receiving at the source volume a series of write commands from a host;

executing the series of write commands on the data file to generate an updated data file at the source volume;

generating a record of the series of write commands;

receiving at a target storage volume snapshot copies of the data file and the write command record from the source volume;

generating data indicated by the write command record at the target storage volume;

receiving at a secondary storage volume a copy of the data file from the target volume;

storing a copy of the data file on the secondary volume;

receiving at the secondary volume data indicated by the write command record from the target volume; and storing the data indicated by the write command record on the secondary volume, wherein the copy of the data file and the data indicated by the write command record are available for use in generating a copy of the updated data file at the secondary volume, wherein the target and secondary volumes together comprise an established PPRC volume pair.

8. The method of claim 7 wherein the source and secondary volumes each comprise a magnetic tape.

9. The method of claim 7 wherein the source and secondary volumes each comprise a magnetic disk.

10. The method of claim 7 wherein the source, target, and secondary volumes each comprise a magnetic tape.

11. The method of claim 7 wherein the source, target, and secondary volumes each comprise a magnetic disk.

12. The method of claim 7 wherein the record of the series of write commands comprises a bitmap.

13. A method for snapshot synchronization of a copy of a data file from a source storage volume in a simplex state to an established peer-to-peer remote copy (PPRC) volume pair in order to migrate the data file copy from a target storage volume of the established PPRC volume pair to a secondary storage volume of the established PPRC volume pair, the method comprising:

providing a source storage volume in a simplex state, the source volume having a data file stored thereon, the source volume for receiving a series of write commands from a host, executing the series of write commands on the data file to generate an updated data file, and generating a record of the series of write commands; and providing an established PPRC volume pair comprising a target storage volume and a secondary storage volume;

the target volume for receiving snapshot copies of the data file and the write command record from the source volume and generating data indicated by the write command record;

the secondary volume for receiving copies of the data file and the data indicated by the write command record from the target volume, storing the copy of the data file and using the stored copy of the data file and the data indicated by the write command record in generating a copy of the updated data file.

* * * * *